(12) United States Patent
Breidenthal, Jr.

(10) Patent No.: US 12,276,239 B1
(45) Date of Patent: Apr. 15, 2025

(54) TRANSVERSE-JET COMBUSTOR FOR A ROCKET ENGINE

(71) Applicant: Robert Edward Breidenthal, Jr., Seattle, WA (US)

(72) Inventor: Robert Edward Breidenthal, Jr., Seattle, WA (US)

( * ) Notice: Subject to any disclaimer, the term of this patent is extended or adjusted under 35 U.S.C. 154(b) by 0 days.

(21) Appl. No.: 18/117,326

(22) Filed: Mar. 3, 2023

(51) Int. Cl.
    *F02K 9/52*     (2006.01)

(52) U.S. Cl.
    CPC ..................... *F02K 9/52* (2013.01)

(58) Field of Classification Search
    CPC ..... F02K 9/42; F02K 9/52; F02K 9/60; F02K 9/62; F02K 9/64; F02K 99/00
    See application file for complete search history.

(56) References Cited

U.S. PATENT DOCUMENTS

| | | | | |
|---|---|---|---|---|
| 3,712,063 | A * | 1/1973 | Andrysiak | F02K 9/64 60/265 |
| 11,391,247 | B1 * | 7/2022 | Borissov | F02K 9/64 |
| 2022/0381201 | A1 * | 12/2022 | Mangeot | F02K 9/60 |

OTHER PUBLICATIONS

Jacob A. Boening et al., "Design and Experiments of a Continuous Rotating Detonation Engine: a Spinning Wave Generator and Modulated Fuel-Oxidizer Mixing", AIAA 2016-4966, 52nd AIAA/SAE/ASEE Joint Propulsion Conference, Jul. 25-27, 2016, Salt Lake City, UT.

Fiona Spencer, Giovanni Nino, Janna Wai, Jonathan M. Wai, and Robert Breidenthal, "Mixing in a Novel Rocket Engine", AIAA 2024-0346, AIAA SCITECH 2024 Forum, Jan. 8-12, 2024, Orlando, FL.

R.E. Breidenthal et al., "Turbulent mixing in two-dimensional ducts with transverse jets", 1986 AIAA Journal 21(11), pp. 1867-1869.

J.E. Broadwell and R.E. Breidenthal, "A simple model of mixing and chemical reaction in a turbulent shear layer", 1982 J. Fluid Mech.

C.T. Crowe et al., "Multiphase Flows with Droplets and Particles", CRC Press, 1997, pp. 24-26.

A.C. Edwards et al., "Turbulent mixing in tubes with transverse injection", 1985 A.I.Ch.E. J. 31, pp. 516-518.

D.T. Harrje et al., (eds.), "Liquid Propellant Rocket Combustion Instability", NSA SP-194, 1972, pp. 350-360.

* cited by examiner

*Primary Examiner* — Scott J Walthour

(57) ABSTRACT

This invention exploits the fundamental physics of turbulent mixing to improve bi-propellant chemical rocket engines. Instead of the many axial reactant injectors in conventional engines, only two transverse injectors are required to generate a pair of large, counter-rotating, streamwise vortices and to mix the reactants for the case of a circular combustion chamber. The vortex pair controls the rate of mixing and the rate of heat release, insensitive to pressure waves and relatively immune to combustion instabilities. The injector of a liquid propellant generates droplets, some of which may contact the opposite wall of the combustion chamber to aid in wall cooling. With the dramatic reduction in the number of injectors, the invention lowers engine mass and manufacturing costs while improving engine reliability.

8 Claims, 3 Drawing Sheets

TRANSVERSE-JET COMBUSTOR FOR A ROCKET ENGINE

BRIEF STATEMENT OF THE INVENTION

This application relates to a system for injecting chemical reactants into a combustion chamber. More particularly, this application relates to combustion chamber and reactant injection geometry for bi-propellant, chemical rocket engines.

SUMMARY OF THE INVENTION

It is an object of the present application to provide a bi-propellant chemical rocket engine for converting combustion energy into useful thrust force, which obviates or mitigates at one disadvantage of the prior art.

According to a first aspect, there are provided reactant injection nozzles, a combustion chamber, and converging-diverging Laval-type exhaust nozzle.

According to another aspect, there are provided reactant injection nozzles in a substantially transverse orientation with respect to the thrust vector. The thrust from these nozzles creates a pair of counter-rotating vortices in the case of a circular combustion chamber that rapidly mixing the two reactants. Since the rotational Mach number of the vortex pair is much less than one, their rotation period is much greater than the acoustic transit time across the diameter of the chamber. Furthermore, the entrainment and mixing processes are insensitive to the pressure field.

DESCRIPTION OF THE PRIOR ART

Conventional bi-propellant chemical rocket engine designs utilize many small injection nozzles for the two reactants, all substantially aligned in a streamwise direction, parallel to the central axis of the combustion chamber. The term "streamwise" refers to the direction of the flow through the Laval-type engine nozzle and the engine thrust vector. The resulting turbulent eddies are relatively small and have a relatively short rotation period, much smaller than the round-trip acoustic time in the combustion chamber. In some designs, such as the famous F1 engine developed for the Apollo space program, partitions or baffles were added to help attenuate the coupling of the transverse pressure waves with the turbulent mixing rate to inhibit combustion instabilities. Disadvantages of conventional designs include the complexity, mass, and multiple failure modes of the complicated injector plumbing.

BRIEF DESCRIPTION OF THE FIGURES

For a better understanding of the various embodiments described herein, and to show more clearly how these various embodiments may be carried into effect, reference will be made, by way of example to the accompanying drawings, which show at least one example embodiment, and which are now described. The drawings are not intended to limit the scope of the teaching described herein.

DETAILED DESCRIPTION OF THE INVENTION

Figure 1:
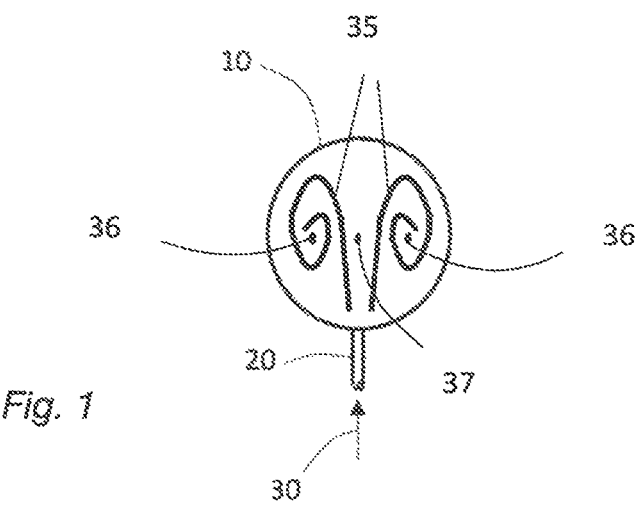
FIG. 1 shows an end view of a rocket combustion chamber.

Various apparatuses, methods, and compositions are described below to provide an example of a least one embodiment of the claimed subject matter. No embodiment described below limits any claimed subject matter and any claimed subject matter may cover apparatuses and methods that differ from those described below. The claimed subject matter are not limited to apparatuses, methods, and compositions having all the features of any one apparatus, method, or composition described below or to features common to multiple or all of the apparatuses, methods, or compositions described below.

Furthermore, it will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about", and "approximately" as used herein mean a reasonable amount of deviation of the modified term such that the result is not significantly changed.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of then invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All the references cited herein are incorporated by reference. Aspects of the disclosure can be modified, if necessary, to employ the systems, functions, and concepts of the above references and application to provide yet further embodiments of the disclosure. These and other changes can be made to the disclosure considering the detailed description.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The end view of combustion chamber 10 of a bi-propellant chemical rocket engine is shown in FIG. 1. A reactant 30 flows through at least one injector 20. The combined thrust from the injectors forms a counter-rotating vortex pair 35. The individual vortices rotate about axes 36, substantially parallel to the center axis 37 of the combustion chamber 10.

Figure 2:
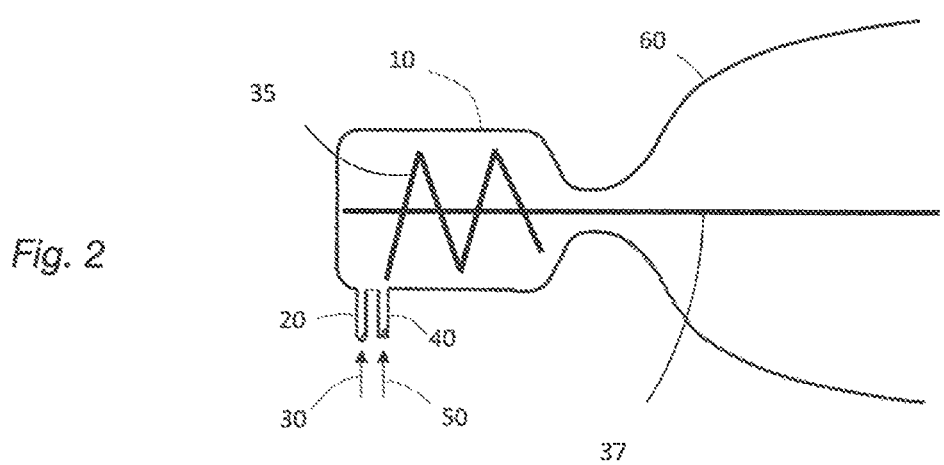
FIG. 2 shows a cross-section side view of a rocket engine, including the exhaust nozzle.

A cross-section through the plane of symmetry is indicated in FIG. 2, revealing a second reactant 50 injected through at least one injector 40 into the combustion chamber 10. After the two reactants mix and react in the combustion chamber, their hot chemical products are accelerated through a convergent-divergent Laval exhaust nozzle 60 to high exhaust velocity to generate a thrust force.

Figure 3:
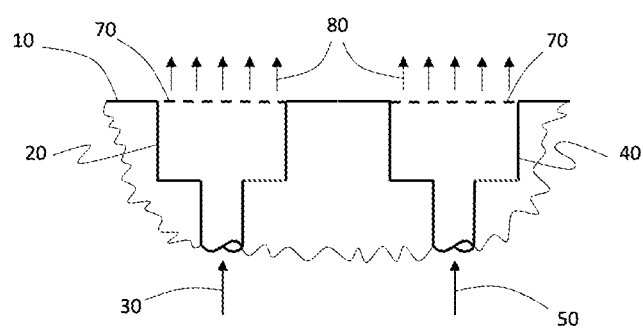
FIG. 3 shows a cross-section view of two liquid propellant injector nozzles.

FIG. 3 shows a cross-section view of two showerhead-type liquid nozzle injectors 20 and 40 injecting reactants 30 and 50, respectively. The atomization of the liquid reactants into small drops 80 may be enhanced by showerhead-type of perforated plates 70.

The showerhead can have an essentially flat orifice plate 70, as illustrated in FIG. 2, or it can be bowed out into a dome to widen the spray pattern and to enhance the momentum exchange with the surrounding vapor. A swirl nozzle is another means of atomizing the liquid and widening the spray pattern.

Figure 4:
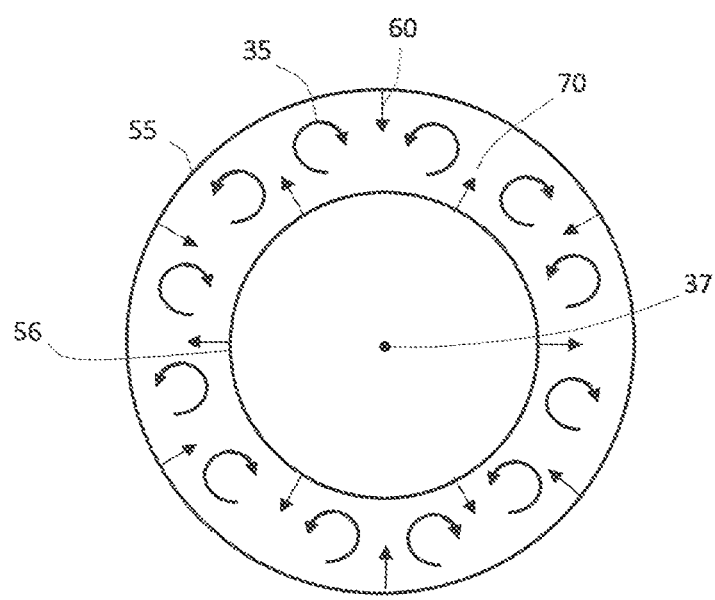
FIG. 4 is a schematic transverse cross-sectional view of an annular rocket engine combustor, illustrating the staggered propellant transverse jets and the resulting streamwise vortices.

FIG. 4 is a schematic of a transverse cross-sectional view of an annular combustion chamber of a rocket engine, defined by an outer wall 55 and an inner wall 56. Injectors of one propellant positioned around the outer wall generate transverse jets 60, and injectors of the other propellant are positioned around the inner wall, generating transverse jets 70. The azimuthal positions of the two sets of injectors are staggered, so that jets from each set contribute to the strength of the streamwise vortices 35.

Enough of the resulting droplets from each perforated nozzle exit should be sufficiently small that their inertial response time is less than the transit time of the jet across the chamber. In this way, their injection momentum is transferred to the vapor, resulting in the large, streamwise vortex pair that fills the circular chamber.

For small droplets in the Stokes regime, Reynolds number less than one, the inertial response time $\tau_d$ of a droplet is $$\frac{2\rho_d r^2}{9\rho v},$$

where $\rho_d$ is the droplet density, $\rho$ is the vapor or gas density, r is the droplet radius, and v is the kinematic viscosity of the gas (Crowe et al. 1997). If the transverse nozzle injection speed is $V_j$ and the chamber diameter is D, assuming for simplicity that the droplet speed is constant, then the droplet radius should be smaller than about $$r < \frac{9\rho D v}{2\rho_d V_j}.$$

A more refined estimate can be made by accounting for the deceleration of the droplet.

To achieve a sufficiently small inertial response time, the liquid propellant must be injected at sufficiently high pressure. The Weber number $$We = \rho V_j^2 r/\sigma$$

determines the droplet radius from a nozzle (Crowe et al. 1997). Here $\sigma$ is the surface tension coefficient. From a balance between inertial and surface tension forces, a liquid jet breaks up into ever smaller droplets until they reach a size that gives a Weber number of about one. This implies a minimum propellant injection pressure to transfer the droplet momentum of about $$\Delta p_j = \frac{\rho_d}{\rho} \rho V_j^2 = \rho_d \left[ \frac{2\rho_d}{9\rho v D} \left( \frac{\sigma}{\rho} \right)^2 \right]^{2/3}.$$

For larger or faster droplets not in the Stokes regime, there is a somewhat different relationship. The inertial response time is $$\tau_d = \frac{8}{3} \frac{1}{c_D} \frac{\rho_d}{\rho} \frac{r}{V_j},$$

where $c_D$ is the drag coefficient of the droplet. Setting $\tau_d$ equal to the characteristic transit time across the diameter of the combustion chamber and solving for the droplet radius, $$r = \frac{3}{8} c_D \frac{\rho}{\rho_d} D.$$

For unity Weber number, $$r = \frac{\sigma}{\rho V_j^2}.$$

To achieve effective momentum exchange from droplets at higher Reynolds number, the minimum liquid nozzle pressure difference is about $$\Delta p_j = \rho_d V_j^2 = \frac{\rho_d}{\rho} \rho V_j^2 = \frac{8}{3} \frac{1}{c_D} \left( \frac{\rho_d}{\rho} \right)^2 \frac{\sigma}{D}.$$

As a rough approximation, c D of a sphere is of order one for Reynolds numbers from about one to 300,000. For each liquid propellant, the total exit area of all the injector nozzles should correspond to the desired mass flow, accounting for the stoichiometry of the reaction and the choked flow in the exhaust nozzle.

Evaporation of the liquid reactant leads to a mass transfer analogous to the momentum transfer discussed above. If the droplets are sufficiently small that they completely evaporate before impinging on the wall, they will have also transferred their momentum to the vapor, thereby contributing to the formation of the counter-rotating vortices.

The turbulent vortex pair may provide sufficient velocity fluctuations in the upstream direction for adequate flame-holding, depending on the Damkohler number of the vortex pair and the chemical ignition delay time. If not, it may be necessary to maintain an ignition source in the chamber at a station sufficiently far downstream to ensure that the propellants there are well mixed. The ignition source could be a continuous plasma discharge or a flameholder bluff body.

The combustion chamber may have a circular cross section, as illustrated in FIG. 1. In some applications, such as aerospike rocket engines, it may have a different shape, such as annular. As in rotating detonation wave engines (20170146244-A1), the counter-rotating vortices should have an aspect ratio of about one, so the reactant injectors should be configured accordingly. Their azimuthal separation should be about equal to twice the width of the annulus if all the injectors are on the inner or the outer surface of the annulus. If the injectors of one reactant are arrayed on one surface of the annulus, and the injectors of the other reactant on the other side, then the injectors should be staggered in the azimuthal direction (20170146244-A1).

Undesirable heat transfer to the walls of the combustion chamber may be inhibited by the stable radial stratification within the boundary layer, with hot, light gas on the inside of the curve, and relatively cool, heavy gas on the outside of the curve near the wall. Competing against the stabilizing density stratification is the destabilizing velocity gradient in the boundary layer, which tends to generate Taylor-Goertler vortices.

The stationarity of the counter-rotating vortex pair may also inhibit heat transfer by preserving laminar boundary layers even while the interior flow is turbulent.

One means to help cool the wall is to allow some of the droplets of one of the reactants to reach the interior wall of the combustion chamber. This is achieved by appropriate nozzle pressure and design, as described above. Since both reactants must be in the vapor phase to combust, a liquid-coated wall will remain relatively cool. This technique may minimize or eliminate the need for complicated and expensive regenerative cooling of the combustion chamber and the throat of the engine Laval nozzle.

To precisely control the amount of liquid that reaches the wall, one embodiment would utilize two separate injectors for one of the reactants. One injector operates at a relatively high pressure, so that it generates relatively small droplets that do not contact the opposite wall. The other injector operates at a lower pressure, perhaps by means of a pressure-dropping valve or pressure regulator, so that it generates sufficiently large droplets to contact the wall.

The invention claimed is:

1. A chemical rocket propulsion system comprising:
a pressurized supply of a fuel propellant and a pressurized supply of an oxidizer propellant;
a combustion chamber comprising a wall defining a combustion chamber volume and a central axis extending through the combustion chamber volume;
at least one first injection nozzle for the fuel propellant mounted to the wall at a first azimuthal position about the central axis;
at least one second injection nozzle for the oxidizer propellant mounted to the wall of the combustion chamber at the first azimuthal position about the central axis such that the at least one first injection nozzle and the at least one second injection nozzle are aligned, and spaced apart, along the central axis in a direction parallel to the central axis and are oriented substantially transverse to the central axis;
wherein the wall lacks injection nozzles at all azimuthal positions about the central axis except the first azimuthal position;
wherein, during operation of the chemical rocket propulsion system, the at least one first injection nozzle and the at least one second injection nozzle are configured to inject the fuel propellant and the oxidizer propellant, respectively, to generate a pair of counter-rotating vortices within the combustion chamber which rotate about respective axis substantially parallel to the central axis; and
a downstream exhaust nozzle connected to the wall to receive exhaust gases from the combustion chamber.

2. The chemical rocket propulsion system of claim 1, wherein the combustion chamber has a circular cross section perpendicular to the central axis.

3. The chemical rocket propulsion system of claim 1, wherein the at least one first injection nozzle and the at least one second injection nozzle are positioned near an upstream end of the combustion chamber.

4. The chemical rocket propulsion system of claim 1, wherein at least one of the fuel propellant and the oxidizer propellant is injected as a liquid.

5. The chemical rocket propulsion system of claim 1, wherein at least one of the fuel propellant and the oxidizer propellant is injected as a spray from a multi-orifice spray head.

6. The chemical rocket propulsion system of claim 1, wherein at least one of the fuel propellant and the oxidizer propellant is injected as a spray from a swirl atomizer.

7. The chemical rocket propulsion system of claim 1, wherein at least one of the fuel propellant and the oxidizer propellant is supplied at a pressure sufficient to generate droplets with an inertial response time equal to or less than the chamber diameter divided by a nozzle injection speed.

8. The chemical rocket propulsion system of claim 1, wherein at least one of the fuel propellant and the oxidizer propellant is injected such that some of the at least one of the fuel propellant and the oxidizer propellant contacts the wall of the combustion chamber.

\* \* \* \* \*